US010866199B2

(12) United States Patent
Mali

(10) Patent No.: US 10,866,199 B2
(45) Date of Patent: Dec. 15, 2020

(54) APPARATUS FOR VAPOUR-LIQUID-EQUILIBRIUM (VLE) DATA MEASUREMENT

(71) Applicant: COUNCIL OF SCIENTIFIC & INDUSTRIAL RESEARCH, New Delhi (IN)

(72) Inventor: Nilesh Atmaram Mali, Pune (IN)

(73) Assignee: COUNCIL OF SCIENTIFIC AND INDUSTRIAL RESEARCH, New Delhi (IN)

(*) Notice: Subject to any disclaimer, the term of this patent is extended or adjusted under 35 U.S.C. 154(b) by 248 days.

(21) Appl. No.: 15/775,939

(22) PCT Filed: Nov. 17, 2016

(86) PCT No.: PCT/IN2016/050405
§ 371 (c)(1),
(2) Date: May 14, 2018

(87) PCT Pub. No.: WO2017/085744
PCT Pub. Date: May 26, 2017

(65) Prior Publication Data
US 2018/0321171 A1 Nov. 8, 2018

(30) Foreign Application Priority Data
Nov. 17, 2015 (IN) .............. 3742/DEL/2015

(51) Int. Cl.
G01N 25/02 (2006.01)
G01N 25/08 (2006.01)
(52) U.S. Cl.
CPC .................... G01N 25/08 (2013.01)
(58) Field of Classification Search
CPC .................................. G01N 25/08
See application file for complete search history.

(56) References Cited

U.S. PATENT DOCUMENTS

| 3,794,566 A * | 2/1974 | Raal ............. | G01N 25/14 202/160 |
| 5,611,895 A * | 3/1997 | Genser ........... | B01D 3/085 202/182 |
| 2012/0033711 A1 * | 2/2012 | Susial Badajoz ...... | G01N 25/08 374/179 |

FOREIGN PATENT DOCUMENTS

CN 101726508 A 6/2010

OTHER PUBLICATIONS

EPO English translation of Chinese Patent Application CN101726507. (Year: 2010).*

(Continued)

Primary Examiner — Stephen D Meier
Assistant Examiner — Nasir U. Ahmed
(74) Attorney, Agent, or Firm — Abelman, Frayne & Schwab

(57) ABSTRACT

An apparatus for Vapour Liquid Equilibrium (VLE) data measurement of a mixture to establish a quick equilibrium and to avoid flashing is disclosed herein. With the known apparatus, the underlining problems are heat loss or improper mixing, flashing inside the apparatus High boiling point difference, and prolong time to establish equilibrium conditions. In order to overcome stated problems, the apparatus is provided with a vapour-liquid mixer (K) for proper mixing of equilibrium liquid from the equilibrium chamber and vapor condensate from the condenser (L) before recycling back to the boiling chamber (F) to avoid any temperature and composition gradient and for fast attainment of equilibrium. Additionally, a cooling jacket (P) is provided to a mixing chamber (K) and a connecting tube between an equilibrium chamber and the mixing chamber (K) to avoid flashing for the accurate measurement of VLE data.

10 Claims, 6 Drawing Sheets

(56) References Cited

OTHER PUBLICATIONS

International Search Report for PCT/IN2016/050405 dated Apr. 11, 2017.

Dania S. M. Constantino, et al., Isobaric Vapor-Liquid Equilibrium Data for Binary System of Glycerol Ethyl Acetal and Acetonitrile at 60.0 kPa and 97.8 kPa, Journal of Chemical and Engineering Data, vol. 58, No. 6, pp. 1717-1723, Jun. 13, 2013).

M.A. Joseph, et al., Phase equilibrium properties of binary systems with diacetyl from a computer controlled vapour-liquid equilibrium still, Fluid Phase Equilibria, vol. 182, No. 1-2, pp. 157-176, Jun. 1, 2001.

W.L. Rodrigues, et al., "Experimental Vapor-Liquid Equilibria Data for Binary Mixtures of Xylene Isomers," Brazilian Journal of Chemical Engineering, vol. 22, No. 03, pp. 453-462, Jul.-Sep. 2005.

Yumei Li. "Measurement and Correlation of Isobaric Vapor-Liquid Equilibrium for The Binary System of Cyclopentane and Tetrahydrofuran" Brazilian Journal of Chemical Engineering, vol. 31, No. 03, pp. 815-820, Jul.-Sep. 2014.

Vanessa D. Martins, et al., "Isobaric Vapor-Liguid Equilibrium for Binary Systems of 2,2,4-Trimethylpentane with o-Xylene, m-Xylene, p-Xylene, and Ethylbenzene at 250 kPa," Journal of Chemical & Engineering Data, vol. 59, pp. 1499-1506 (2014).

M.A. Joseph, et al., "Phase equilibrium properties of binary systems with diacetyl from a computer controlled vapour-liquid equilibrium still," Fluid Phase Equilibria, vol. 182, pp. 157-176 (2001).

\* cited by examiner

APPARATUS FOR VAPOUR-LIQUID-EQUILIBRIUM (VLE) DATA MEASUREMENT

FIELD OF THE INVENTION

The invention relates to a vapour liquid equilibrium (VLE) data measurement apparatus. More particularly, the present invention relates to a dynamic still for measurement of VLE data.

BACKGROUND OF THE INVENTION

Vapour-Liquid-Equilibrium (VLE) data is an important data set for process modeling and simulation as well as for design of separation equipment such as absorber, extractor, distillation column and so on. Reliable experimental vapor-liquid equilibrium (VLE) data is of both theoretical and practical significance in science and industry. From the scientific point of view, these data can be used to compare the strengths and weaknesses of various theoretical models that have been devised for this purpose, and on the other hand, in practice they are essential for the proper design of separation units for the purification of final products of an industrial chemical process.

Apparatus for measuring VLE data is well known and has undergone several changes to suit the measurement for different types of mixtures.

Article titled "Phase equilibrium properties of binary systems with diacetyl from a computer controlled vapour-liquid equilibrium still" by MA Joseph et al. published in *Fluid Phase Equilibria*, 2001, 182 (1-2), pp 157-176 reports isothermal vapour-liquid equilibrium (VLE) data for binary mixtures of diacetyl with toluene and cyclohexane at 318.15, 328.15 and 338.15 K with the aid of a dynamic VLE still. A computer is used to control the temperature and pressure in the still.

An article titled "Experimental Vapor-Liquid Equilibria Data For Binary Mixtures Of Xylene Isomers" by Rodrigues et al. published in Brazilian Journal of Chemical Engineering, Vol. 22, No. 03, pp. 453-462, July-September, 2005 studies binary systems of xylene isomers. The apparatus used for this study consists of a heating bulb, a Cottrell pump, a discard valve and a magnetic stirrer.

Another article titled "Measurement And Correlation Of Isobaric Vapor-Liquid Equilibrium For The Binary System Of Cyclopentane And Tetrahydrofuran" by Yumei Li published in Brazilian Journal of Chemical Engineering, Vol. 31, No. 03, pp. 815-820, July-September, 2014 examines isobaric vapor-liquid equilibrium measurements for the mixture of cyclopentane and tetrahydrofuran at 101.3 kPa. The apparatus includes a heating mantle, a boiling chamber, a thermometer, a liquid mixture input, an equilibrium chamber, a condenser, a vapor phase sampling port, an equilibrium tube and a mixing chamber.

In an article, bearing dx.doi.org/10.1021/je401057z published in J. Chem. Eng. Data 2014, 59, 1499-1506, isobaric VLE measurements were conducted for the binary systems of isooctane with p-, m-, or oxylene and EB at 250 kPa using a recirculating still apparatus. The apparatus consists of a flow heater (glass tube), a Cottrell circulation pump, a separation chamber, a mixing chamber, a protection campane, a compensation heating Jacket, plurality of sampling nozzles, plurality of glass receiver tubes, a solenoid coil, and plurality of resistance thermometers.

Raal et al. (2001) have developed a highly refined dynamic VLE still, which is illustrated in FIG. 1. The still was suitable for low-pressure measurements. In the said VLE still, the packed equilibrium chamber is used, which spirals around a vacuum insulated Cottrell tube (G). The packing consists of 3 mm stainless steel mesh cylinders. A vacuum jacket (D) eliminates any heat transfer from a superheated mixture to the packed equilibrium chamber. The mixture subsequently enters the equilibrium chamber, flowing over the packing onto a Pt-100 temperature sensor (C) that is located near the exit from the packed section. Equilibrium liquid exits through small drain holes (B) at the bottom of the equilibrium chamber, flowing over a stainless steel mixing spiral (F) to the liquid sampling trap, the overflow of which leads back to the boiling chamber. The vapour flows through the insulated tubing to a condenser (L) where it condenses into a condensate trap and re-circulates to the boiling chamber. The features of these stills are as follows: 1) Packing is used in the equilibrium chamber to ensure rapid attainment of equilibrium due to intimate contact between the vapour and the liquid and the expansion of the interfacial surface area. 2) Stirring in the condensate receiver eliminates temperature and concentration gradients. This ensures high reproducibility of the vapour sample concentrations. 3) A system of internal and external heaters is used in the boiling chambers to ensure rapid boiling, permit precise control of the circulation rate, and provide nucleation sites for smooth boiling. However, proper mixing of the compositions, due to which faster attainment of the equilibrium and generation of samples of equilibrium vapour and liquid is achieved, may get affected in absence of the component for mixing function. The VLE still discussed in Raal et al. does not include such component.

The measurement of accurate VLE data has the following challenges:
1. To establish equilibrium conditions between vapour and liquid and generate samples of equilibrium vapour and liquid. Equilibrium composition may get affected due to heat loss or improper mixing.
2. High boiling point difference leads to flashing inside the apparatus and leads to flooding.
3. Long periods of time to establish equilibrium conditions.

The traditional vapor-liquid equilibrium still generally do not have mixing function. Sending equilibrium liquid and vapour condensate without mixing may cause concentration gradient in boiling chamber and may take long duration for determining the vapor-liquid equilibrium data.

Currently, there are no VLE data measurement apparatus available that can overcome the stated drawbacks of the apparatus to enable such measurements. In addition, none of the above prior art contributing in eliminating flashing. Therefore, there is need for an apparatus which will overcome above stated drawbacks.

OBJECTS OF THE INVENTION

The primary objective of the present invention is to provide a VLE data measurement apparatus that prevents or avoids flashing due to high differences in the boiling point of the two or more liquids under consideration.

One more objective of the invention is to enable easier and faster establishment of equilibrium in the apparatus, thus enabling quicker measurements of VLE data.

Another objective of the present invention is to enable VLE data measurement over wide range of volatilities components.

SUMMARY OF THE INVENTION

The present invention provides a novel VLE data measurement apparatus to establish a quick equilibrium and to avoid flashing.

In an aspect, the apparatus comprises a vacuum jacket for Equilibrium Chamber (D); magnetic stirrers (E), an boiling chamber (F); an insulated Cottrell Tube (G); a vacuum jacket for Cottrell Tube (H); an external heater (I); a mixing chamber (K); a condenser (L). Further, a vapour-liquid mixer (K) is provided for proper mixing of at least two components wherein one component is equilibrium liquid from the equilibrium chamber and other component is vapor condensate from the condenser (L) before recycling back to the boiling chamber (F) to avoid any temperature and composition gradient and for fast attainment of equilibrium. Furthermore, a cooling jacket is provided to a mixing chamber (K) and a connecting tube between an equilibrium chamber and the mixing chamber (K) to avoid flashing for the accurate measurement of VLE data.

The novelty of the apparatus rests in the provision of a vapour-liquid mixer prior to the boiling chamber and a cooling jacket to the liquid return line from liquid sampling point to vapour-liquid mixing chamber to avoid flashing.

In an embodiment, the apparatus is useful for the generation of VLE data for two or more components with low volatility or with substantially low difference in boiling points.

In another embodiment, the apparatus generates VLE data in much less time when compared to state of the art apparatus used widely.

In an embodiment, the components in the boiling chamber (F) comprises two or more components with low volatility or with substantially high difference in boiling points.

In another embodiment, measurement is carried out from vacuum to atmospheric pressure in the range of 0.0001 to 760 mm Hg.

In an embodiment, the difference in boiling points of the components in the boiling chamber (F) is in the range of 0.1 to 200° C.

In another embodiment, the apparatus for use in the generation of VLE data for two or more components with low volatility or with substantially low difference in boiling points.

In yet another embodiment, a process of obtaining vapour-liquid equilibrium using the apparatus, wherein said process comprises the steps of:

a) feeding at least two components to the boiling chamber (F) through the feeding point (O) and subsequently heating said components through the external heater (I) to obtain vapor-liquid mixture;

b) rising of the vapor-liquid mixture through the Cottrell tube (G) to the equilibrium chamber (U);

c) flowing down of the liquid from the equilibrium chamber (U) to the sampling port (S1) and subsequently to the mixing chamber (K) and flowing down of the vapor from the equilibrium chamber (U) to the condenser (L) and subsequently to the mixing chamber (K);

d) mixing of the equilibrium liquid and vapor condensate in the mixing chamber (K) to obtain vapour-liquid equilibrium and allowing overflow back to the boiling chamber (F).

A—stainless steel wire mesh packing; B—drain holes; C—Pt-100 bulb; D—vacuum jacket; E—magnetic stirrer; F—stainless steel mixing spiral; G—insulated Cottrell pump; H—vacuum jacket; I—internal heater; J—capillary; K—drain valve; S1-liquid sampling point; S2—vapour sampling point; L—condenser.

Figure 1:
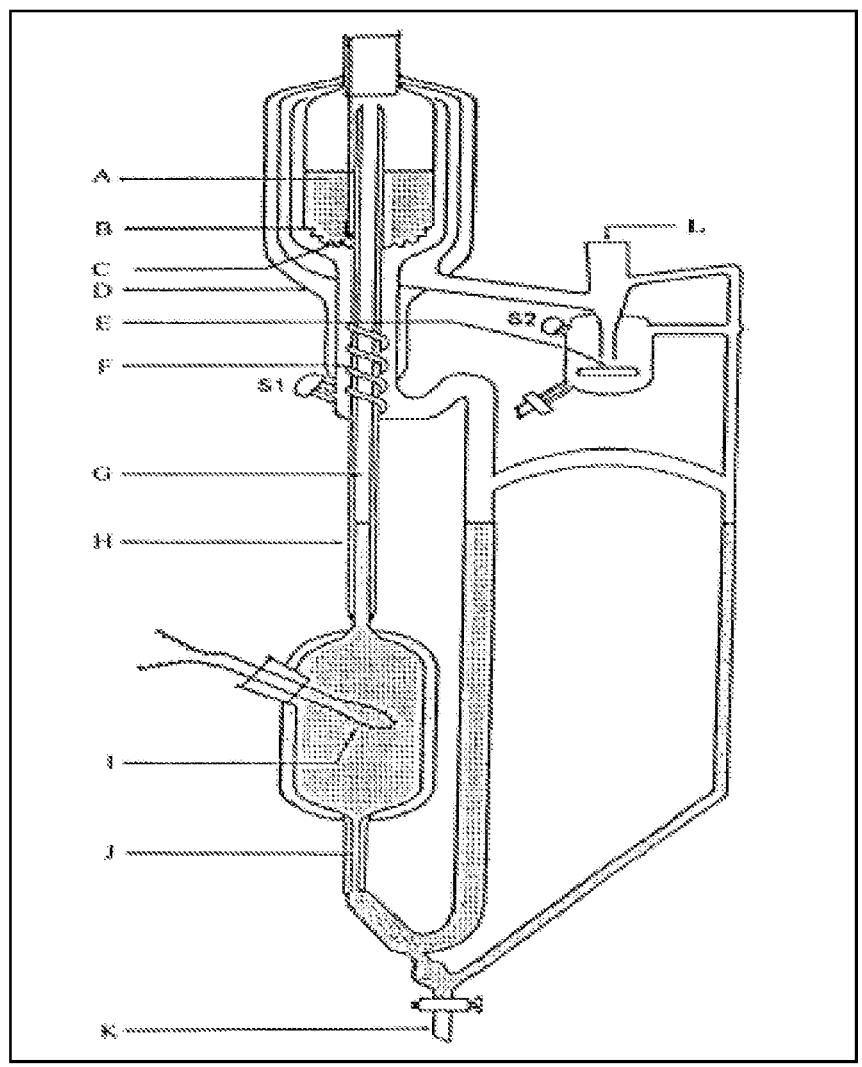
FIG. 1 illustrates a highly refined dynamic VLE still of prior art
Figure 2:
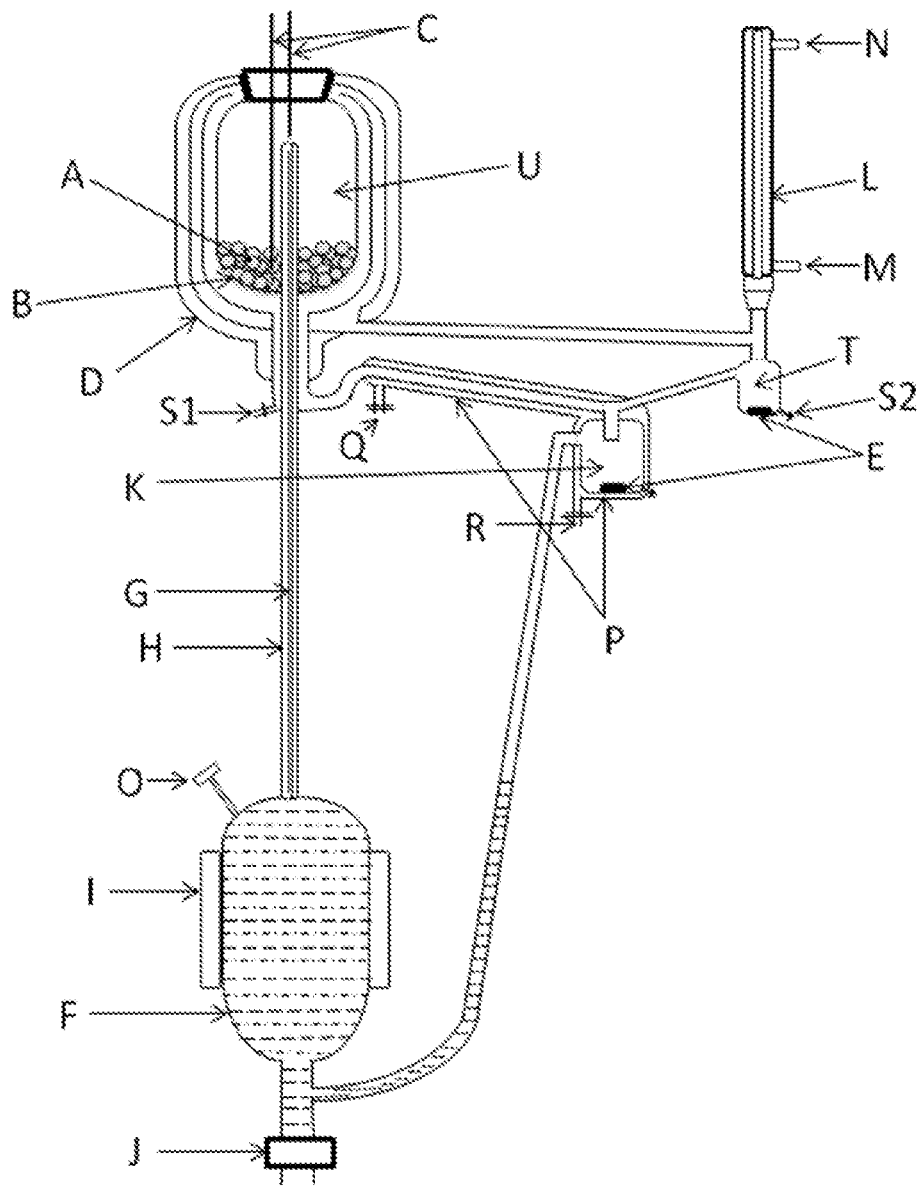

FIG. 2. VLE still apparatus of the present invention:

A—glass balls as a packing; B—drain holes; C—RTD thermometer; D—vacuum jacket for Equilibrium Chamber; E—magnetic stirrers; F—boiling chamber; G—insulated Cottrell Tube; H—vacuum jacket for Cottrell Tube; I—external heater; J—drain valve; K—mixing chamber; L—condenser; M—Coolant inlet; N—Coolant outlet; O—Feeding point; P—Jacket for liquid return line+mixing chamber; Q—Cooling/Heating fluid inlet; R—Cooling/Heating fluid outlet; S1—liquid sampling point; S2—vapour sampling point; T—Condensate Receiver FIG. 3: Equilibrium vapour and liquid flow FIG. 4: Experimental and theoretical VLE data for Acetonitrile+DMSO system.

Figure 5:
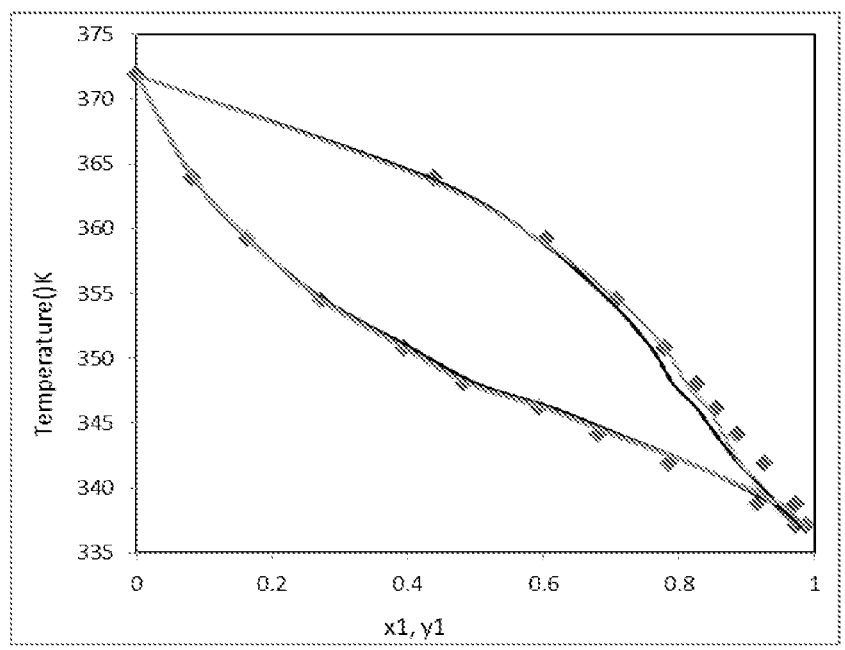

FIG. 5: Experimental and theoretical temperature-composition diagram for methanol+water at 96.89 kPa FIG. 6: Equilibrium vapour liquid composition diagram for methanol+water at 96.89 kPa FIG. 7: Area test diagram of $\ln(\gamma 1/\gamma 2)$ vs x1 for acetonitrile+n-propanol at 96.89 kPa FIG. 8: Experimental and theoretical temperature composition diagram for acetonitrile+n-propanol at 96.89 kPa FIG. 9: Equilibrium vapour liquid composition diagram for acetonitrile+n-propanol at 96.89 kPa

DETAILED DESCRIPTION OF THE INVENTION

The invention will now be described in detail in connection with certain preferred and optional embodiments, so that various aspects thereof may be more fully understood and appreciated.

Accordingly, to accomplish the objectives listed herein, a novel VLE data measurement apparatus is disclosed comprising, vapour-liquid mixer prior to the boiling chamber and a cooling jacket to the liquid return line from liquid sampling point to vapour-liquid mixing chamber to avoid flashing for the accurate measurement of VLE data.

In an embodiment, the present invention provides an apparatus for determination of VLE data of a mixture comprising: a vacuum jacket for Equilibrium Chamber; more than one magnetic stirrers; a boiling chamber; an insulated Cottrell Tube; a vacuum jacket for Cottrell Tube; an external heater; a mixing chamber; a condenser and a Jacket for liquid return line and mixing chamber to avoid flashing.

During VLE measurement, two liquids of different compositions are generated which are at different temperature. A proper mixing of these two liquids is essential to avoid any concentration gradient in the boiling chamber, which may delay the establishment of VLE. The VLE measurement of two liquids with wide difference in boiling point may lead to flashing in mixing chamber or in boiling chamber. Flashing can lead to flooding condition in the apparatus and can disturb the equilibrium compositions achieved. To avoid the said phenomenon, a coiling jacket to the liquid return line is provided which minimizes the temperature difference between the two mixing liquid and will avoid flashing.

In preferred embodiment, said mixture is a mixture of at least two liquids, with difference in boiling points in the range of 0.1 to 200° C. The mixture of liquids includes, but is not limited to, combination of water+methanol, Acetonitrile+1-Propanol.

In another preferred embodiment, said determination is carried out from vacuum to atmospheric pressure in the range of 0.0001 to 760 mm Hg.

In another preferred embodiment, said vapour-liquid mixer is used to facilitate mixing of equilibrium liquid leaving the equilibrium chamber and condensate from the condenser. This reduces the concentration gradient in boiling chamber and reduces time required for attainment of VLE.

In another preferred embodiment, said liquid return line jacket can be used to cool the liquid before mixing chamber to avoid flashing and flooding. The same jacket can also be used to provide heating while measuring VLE of low volatile substances to avoid their precipitation.

In a preferred embodiment, the novel VLE data measurement apparatus is disclosed comprising, refer FIG. 2:

| Part name | Part Description |
| --- | --- |
| A | Glass balls as a packing |
| B | Drain holes |
| C | RTD thermometer |
| D | Vacuum jacket for Equilibrium Chamber |
| E | Magnetic Stirrer |
| F | Boiling chamber |
| G | Insulated Cottrell Tube |
| H | Vacuum jacket for Cottrell Tube |
| I | External heater |
| J | Drain valve |
| K | Mixing chamber |
| L | Condenser |
| M | Coolant inlet |
| N | Coolant outlet |
| O | Feeding point |
| P | Jacket for liquid return line + mixing chamber |
| Q | Cooling/Heating fluid inlet |
| R | Cooling/Heating fluid outlet |
| S1 | Liquid sampling point |
| S2 | Vapor sampling point |
| T | Condensate Receiver |
| U | Equilibrium Chamber |

In a typical example, understood by referring FIG. 2, the feed mixture is charged in the boiling flask from the feed point and heated by external heater (I). Approximate volume of the boiling flask is about 200 cm³. Liquid and vapour from the boiling chamber flows upward through the Cottrell tube (G). The vapour-liquid mixture exits in the equilibrium chamber (U) and flows downward through the packing material. A vacuum jacket (D) is provided to both, the Cottrell tube and the equilibrium chamber. The packing material used is simple glass balls of about 3 to 4 mm diameter. Packing enhances the contact between vapour and liquid phase which lead to rapid attainment of equilibrium conditions.

The procedure to achieve vapour-liquid equilibrium using the preferred embodiment is as follows:

The binary mixture of certain composition is fed to the boiling chamber (F) through the feeding point (O) to a suitable level. The flow of the said mixture is subsequently discontinued. Cooling water is circulated through the condenser (L) before heating the said mixture. Heat is provided to the boiling chamber through the external heater (I), with appropriate heating rate set through a rheostat such that the vapor-liquid mixture rises continuously through the Cottrell tube (G) to the equilibrium chamber (U). Liquid and vapor exit from the equilibrium chamber through the drain holes (B) at the bottom of the equilibrium chamber (U). Liquid flows down to the sampling port (S1) and subsequently to the mixing chamber (K). The vapor flows to the condenser (L) where it is condensed completely. Vapor condensate is collected in the receiver (T) and overflows to the mixing chamber (K). The magnetic stirrer (E) in the mixing chamber (K) is set at a suitable rpm for proper mixing of incoming liquids. Equilibrium liquid and vapor condensate mix well in the mixing chamber (K) and overflow back to the boiling chamber (F). Thus, continuous recirculation of the liquid and vapor is established in the VLE still of the present invention. The mixture is allowed to circulate for sufficient amount of time to attain equilibrium, which is indicated by constant temperature of the temperature sensors C in the equilibrium chamber. In a preferred embodiment, RTD temperature sensors with ±0.1 K accuracy are used.

Both liquid and vapor sample are analyzed, after attaining constant temperature, for composition using refractometer. The liquid phase sample is collected at liquid sampling point S1 whereas the vapor phase sample is collected at the vapour sampling point S2. At the liquid sample collection side, coil arrangement was done for proper mixing of the liquid. At the vapor collection point S2, the magnetic stirrer (E) is provided for proper mixing and to obtain the uniform composition. As the refractometer needs a very small amount of sample to measure refractive index, very small amount of samples, typically <0.5 mL, are withdrawn so that the equilibrium is not disturbed.

For composition analysis, refractive indices of samples were measured at 20° C. using refractometer with accuracy of ±0.0001. The calibration curve of RI vs mole fraction was generated at 20° C. before starting the VLE experiment. Composition was calculated using RI of the sample and the calibration equation obtained by fitting the appropriate polynomial equation to the calibration curve. Two to three samples were taken each for equilibrium liquid and vapor condensate to ensure attainment of equilibrium. When the composition of two consecutive samples was found same, which indicates attainment of VLE, the experiment was stopped. The same procedure was repeated for different feed compositions.

Figure 3:
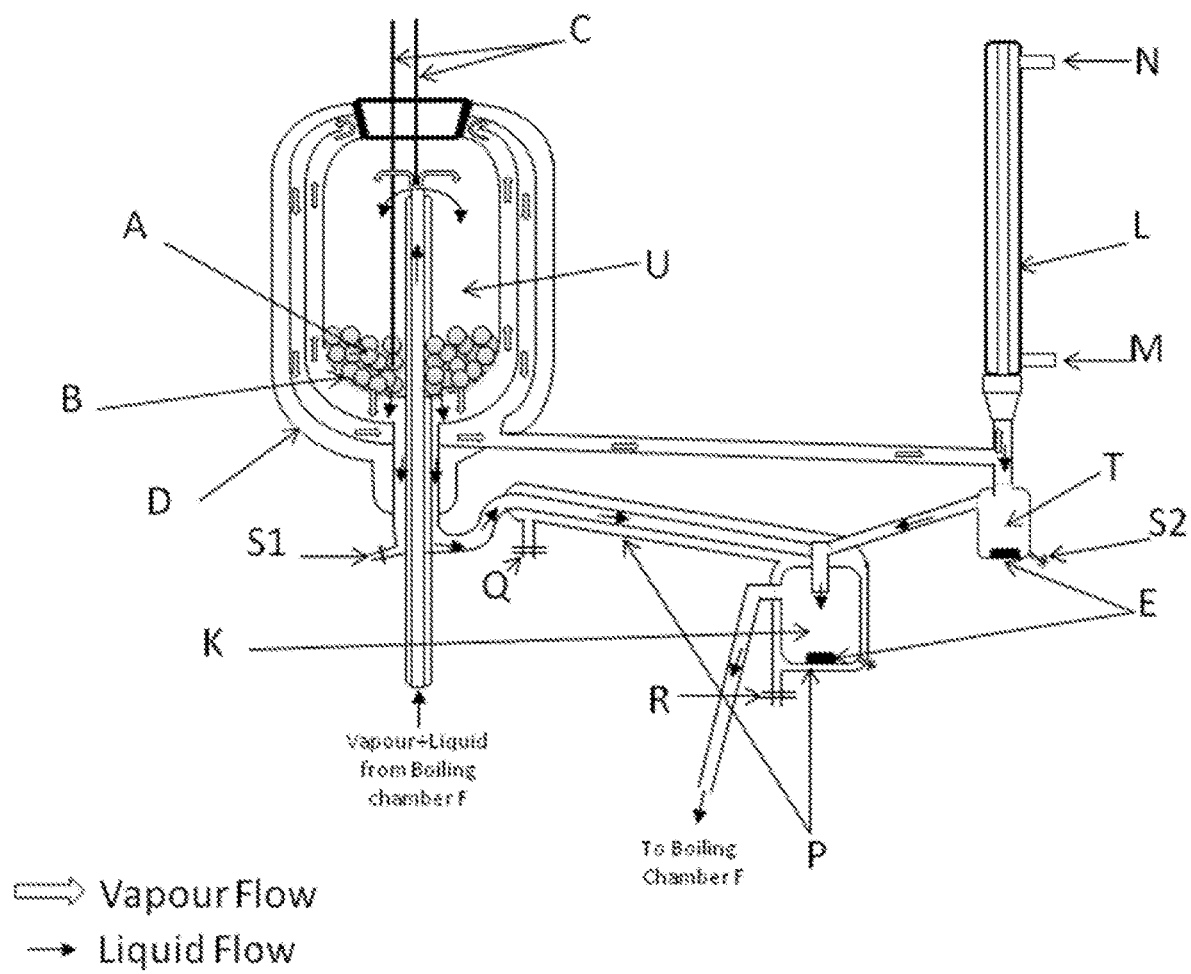

The flow of equilibrium vapour and liquid is as shown in FIG. 3. Liquid after exiting the Cottrell tube (G) flows over the packing (A). Liquid exits from equilibrium chamber drain hole (B). Vapour also exits from the same holes. Liquid flows to mixing chamber (K) through jacketed liquid return line (P). Vapour flows upward as shown by hollow arrows towards condenser (L). Liquid condensate from condenser collects in receiver (T). Liquid from equilibrium chamber and liquid condensate from receiver (T) are mixed in mixing chamber (K). The mixture is sent back to boiling chamber.

The equilibrium mixture exits through openings at bottom of equilibrium chamber (U) and separate into vapour and liquid phase. A RTD Thermometer (c) is placed in the packing (A) of the equilibrium chamber to sense the equilibrium temperature.

The equilibrium liquid phase flows downward over a glass mixing spiral and recirculates to the boiling chamber via mixing chamber (K). The vapour flows downward and moves towards the condenser (L). This vapour flow provides an additional jacket to the equilibrium chamber to reduce heat losses.

The condensed vapour is collected in a condensate receiver (T), and returned to the boiling flask via mixing chamber (K). A jacket (P) is provided to the mixing chamber and the connecting tube between the equilibrium chamber and the mixing chamber (K). A suitable coolant can be circulated through the jacket (K) to avoid flashing in the boiling chamber (F) in case of high relative volatility mixture. In case of low volatile system, some heating medium can be circulated to prevent precipitation of the components. The efficient magnetic stirrer (E) is provided which eliminates temperature and concentration gradients for both the condensate receiver (T) and the mixing chamber (K). The condenser outlet (N) is kept opened to the atmosphere or is connected to suitable system to maintain constant pressure.

EXAMPLES

Following examples are given by way of illustration therefore should not be construed to limit the scope of the invention.

Example 1

Figure 4:
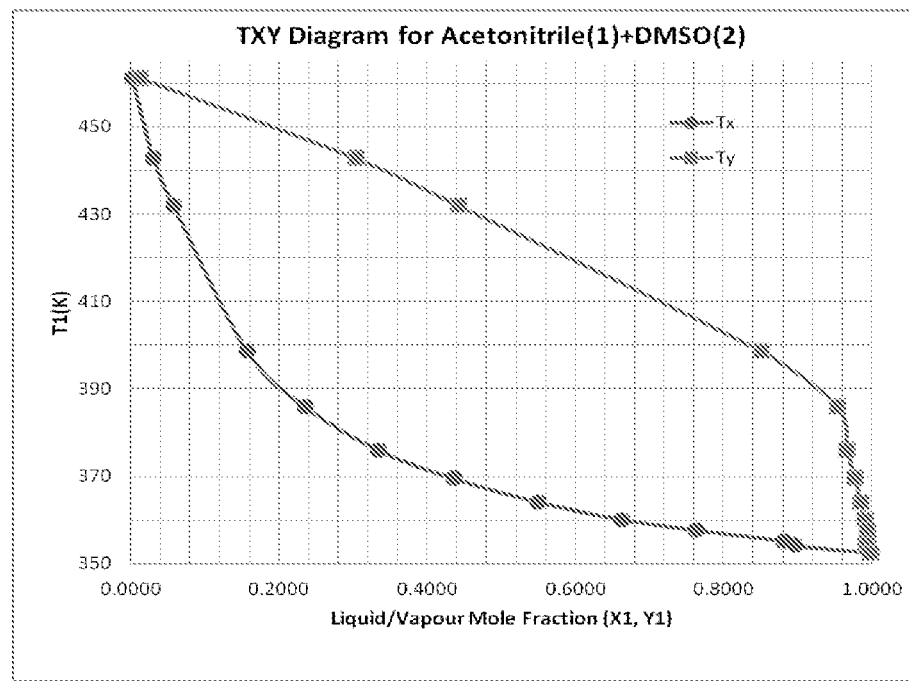

The VLE data generated for the DMSO-Acetonitrile pair is shown in FIG. 4. FIG. 4 shows the comparison of experimental and theoretical data which found to be in good agreement. DMSO has boiling point of 189° C. and Acetonitrile has boiling point of 82° C. During VLE measurement for this pair for a composition above 50 wt % DMSO gives flashing issues which leads to flooding and disturbance in equilibrium compositions achieved. The flashing is completely eliminated in the proposed apparatus with cooling jacket to liquid return line and the mixing chamber. Also, time required to attain VLE condition was significantly lower with mixing chamber as compared to that without mixing chamber.

As the boiling point difference is high for the pair, flashing occurs during VLE measurement when the two liquids are mixed in the mixing chamber K. Flashing leads to flooding condition which pushes liquid in the mixing chamber backwards to the condensate receiver T and liquid sampling point S1. This disturbs the equilibrium composition achieved. Cooling jacket P avoids the flashing problem by precooling the liquid from equilibrium chamber.

Example 2

Methanol+Water System

Figure 6:
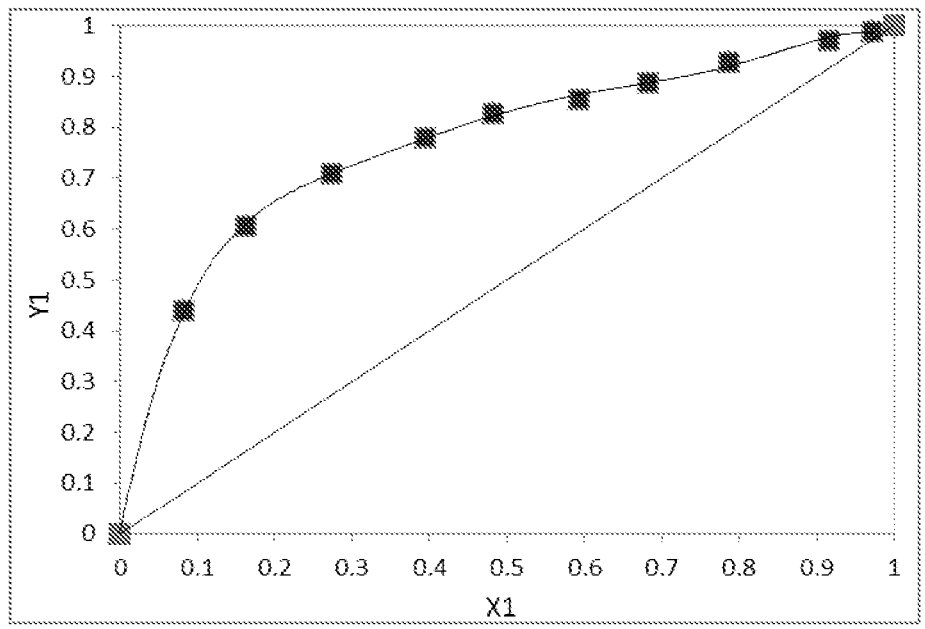
Figure 7:
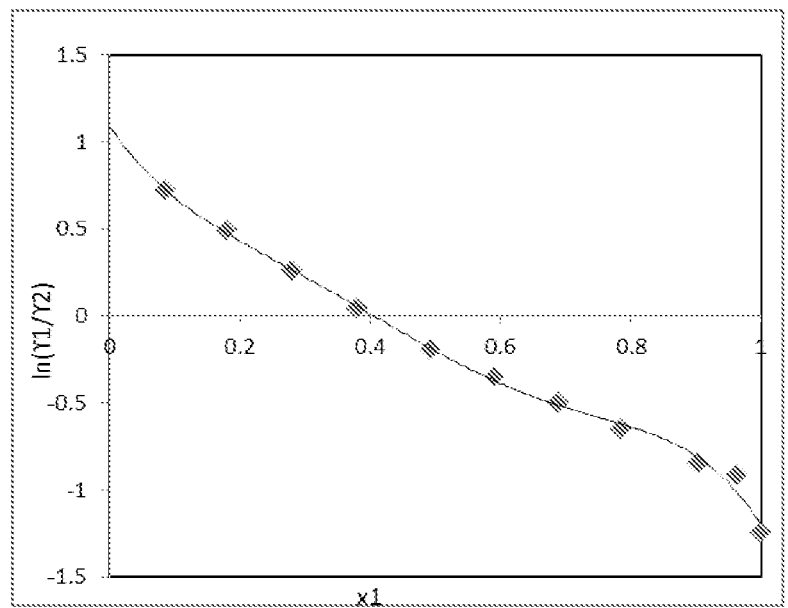

Experimental VLE data of the binary systems methanol+water was measured at 96.89 kPa pressure, which is listed in Table 1 and illustrated in FIG. 6. The measured VLE data of methanol+water system was good agreement with Aspen data at 96.89 kPa pressure, which is illustrated in 6. The experimental binary VLE data were found to be thermodynamically consistent by means of the point-to-point test of Van Ness. According to this method, isobaric data would pass the consistency test if the mean absolute deviation between calculated and measured mass fractions of component i in the vapour phase (Ayi) is less than 0.01. Therefore, binary VLE data of this work could pass the thermodynamic consistency test.

TABLE 1

Experimental VLE data of methanol + water system at 96.89 kPa pressure

| Temp. (K) | $y_1$ | $x_1$ | $P_1^{sat}$ (kPa) | $P_2^{sat}$ (kPa) | Y1 | Y2 |
|---|---|---|---|---|---|---|
| 337.05 | 0.9870 | 0.9716 | 98.8030 | 23.7444 | 0.9962 | 1.8606 |
| 338.76 | 0.9714 | 0.9154 | 105.6708 | 25.6358 | 0.9730 | 1.2785 |
| 341.86 | 0.9264 | 0.7861 | 119.1347 | 29.3918 | 0.9585 | 1.1342 |
| 344.19 | 0.8866 | 0.6820 | 130.1670 | 32.5133 | 0.9677 | 1.0628 |
| 346.18 | 0.8555 | 0.5927 | 140.2482 | 35.3974 | 0.9973 | 0.9708 |
| 348 | 0.8275 | 0.4821 | 150.0262 | 38.2219 | 1.1086 | 0.8443 |
| 350.81 | 0.7792 | 0.3944 | 166.2261 | 42.9558 | 1.1516 | 0.8223 |
| 354.5 | 0.7081 | 0.2731 | 189.6678 | 49.9157 | 1.3246 | 0.7795 |
| 359.16 | 0.6057 | 0.1623 | 223.0973 | 60.0402 | 1.6209 | 0.7596 |
| 363.9 | 0.4393 | 0.0818 | 261.9181 | 72.0542 | 1.9866 | 0.8212 |
| 371.85 | 0.0000 | 0.0000 | 339.3419 | 96.7045 | | 1.0019 |

Example 3

Acetonitrile+1-Propanol System

Figure 8:
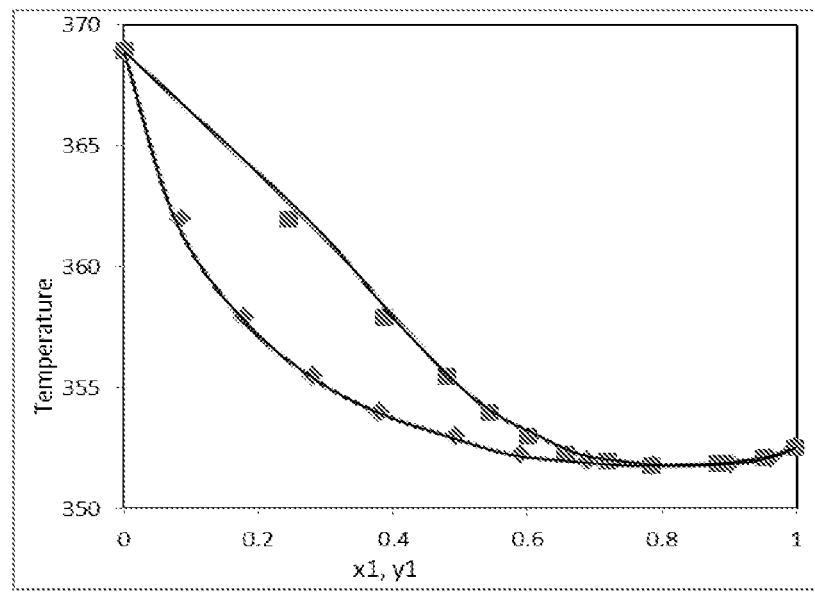
Figure 9:
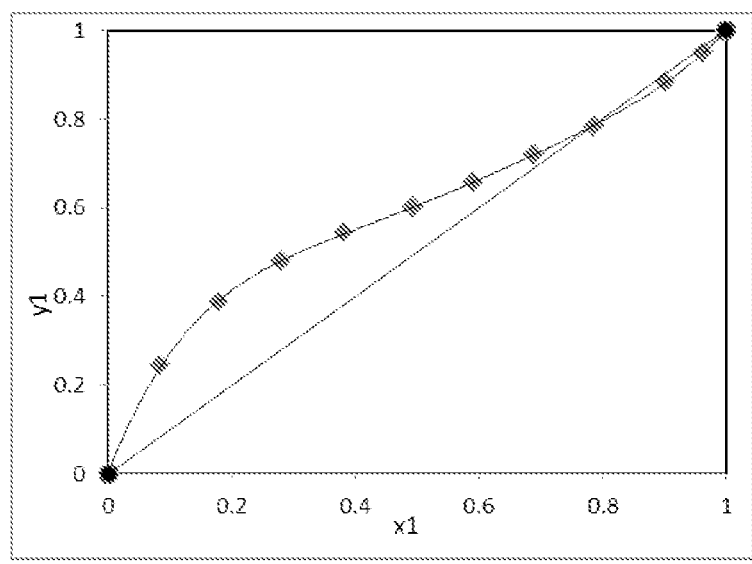

Experimental VLE data of the binary system acetonitrile+1-Propanol was measured at 96.89 kPa pressure which is listed in Table 2. The measured VLE data of acetonitrile+1-Propanol system was in good agreement with Aspen data, which is illustrated in FIGS. 8, 9 and 10. The experimental binary VLE data were found to be thermodynamically consistent by means of the point-to-point test of Van Ness, and area test of Herington test (FIG. 8) and Aspen test. x1 is the mass fraction of acetonitrile in liquid phase and γ1 is the mass fraction of acetonitrile in vapour phase. γ1 and γ2 are the calculated activity coefficients of acetonitrile and water respectively.

TABLE 2

Experimental VLE data of Acetonitrile + 1-Propanol system at 96.89 kPa pressure:

| Temp. (K) | $y_1$ | $x_1$ | $P_1^{sat}$ (kPa) | $P_2^{sat}$ (kPa) | Y1 | Y2 |
|---|---|---|---|---|---|---|
| 352.5 | 0.9981 | 0.9989 | 94.5729 | 50.0674 | 1.0236 | 3.5603 |
| 352.12 | 0.9512 | 0.9626 | 93.4443 | 49.2544 | 1.0247 | 2.5628 |
| 351.86 | 0.8834 | 0.9029 | 92.6785 | 48.7046 | 1.0229 | 2.3885 |
| 351.78 | 0.7846 | 0.7858 | 92.4439 | 48.5364 | 1.0466 | 2.0067 |
| 351.95 | 0.7198 | 0.6894 | 92.9430 | 48.8943 | 1.0884 | 1.7880 |
| 352.24 | 0.6574 | 0.5899 | 93.7995 | 49.5099 | 1.1512 | 1.6349 |
| 353 | 0.6009 | 0.4931 | 96.0747 | 51.1541 | 1.2288 | 1.4916 |
| 353.98 | 0.5431 | 0.3807 | 99.0745 | 53.3411 | 1.3951 | 1.3401 |
| 355.45 | 0.4801 | 0.2808 | 103.7166 | 56.7677 | 1.5973 | 1.2338 |
| 357.91 | 0.3879 | 0.1794 | 111.8790 | 62.9115 | 1.8730 | 1.1487 |
| 361.95 | 0.2454 | 0.0851 | 126.4085 | 74.1972 | 2.2097 | 1.0771 |
| 368.99 | 0.0000 | 0.0000 | 155.3497 | 97.8627 | | 0.9901 |

In all of the aforementioned examples, the experimental values and theoretical values are found to be matching.

Advantages of the Invention

Thus the advantage is the apparatus can be used for two or more components with low volatility or with slight or high differences in boiling points.

Substantially less time needed for VLE data measurements

This glass apparatus is used to measure this VLE data at atmospheric pressure or below atmospheric pressure i.e. vacuum.

I claim:

1. An apparatus for generating a Vapour Liquid Equilibrium (VLE) samples comprising; an Equilibrium Chamber (U); a vacuum jacket (D) for the Equilibrium Chamber (U);

magnetic stirrers (E) for a condensate receiver (T) and a mixing chamber (K); an insulated Cottrell Tube (G); a vacuum jacket (H) for the Cottrell Tube (G); an external heater (I) in thermal communication with a boiling chamber (F); and a condenser (L); wherein the equilibrium chamber (U) is connected to the condenser (L) through downward vapor flow connecting tube;

the boiling chamber (F) is connected to the equilibrium chamber (U) through the insulated Cottrell Tube (G);

the mixing chamber (K) is provided for mixing of at least two components, wherein one component is equilibrium liquid from the equilibrium chamber (U) and another component is vapor condensate from the condenser (L) which is provided before recycling back to the boiling chamber (F) to avoid any temperature and composition gradient and for fast attainment of equilibrium; and a cooling jacket (P) is provided to the mixing chamber (K), a connecting tube between the equilibrium chamber (U) and the mixing chamber (K), and to the liquid return line from liquid sampling point (S1) to the mixing chamber (K) to avoid flashing.

2. The apparatus as claimed in claim 1, wherein the components in the boiling chamber (F) comprises two or more components with low volatility or with substantially high difference in boiling points.

3. The apparatus as claimed in claim 1, wherein said measurement is carried out from vacuum to atmospheric pressure in the range of 0.0001 to 760 mm Hg.

4. The apparatus as claimed in claim 1, wherein the difference in boiling points of at least two components is in the range of 0.1 to 200° C.

5. A process of obtaining vapour-liquid equilibrium using the apparatus as claimed in claim 1, wherein said process comprises the steps of:

a) feeding at least two components to the boiling chamber (F) through the feeding point (O) and subsequently heating said components through the external heater (I) to obtain vapor-liquid mixture;

b) rising of the vapor-liquid mixture through the Cottrell tube (G) to the equilibrium chamber (U);

c) flowing down of the liquid from the equilibrium chamber (U) to the sampling port (S1) and subsequently to the mixing chamber (K) and flowing down of the vapor from the equilibrium chamber (U) to the condenser (L) and subsequently to the mixing chamber (K);

d) mixing of the equilibrium liquid and vapor condensate in the mixing chamber (K) to obtain vapour-liquid equilibrium and allowing overflow back to the boiling chamber (F).

6. The apparatus as claimed in claim 1, wherein the equilibrium chamber (U) comprises; glass balls as a packing material (A), drain holes (B) through liquid and vapor exit the equilibrium chamber, RTD thermometer (C) to detect the equilibrium temperature, and a liquid sampling point (S1) through which liquid phase sample is collected.

7. The apparatus as claimed in claim 1, wherein the boiling chamber (F) comprises; inlet for said mixture of components through a feeding point (O) and heating said components through the external heater (I).

8. The apparatus as claimed in claim 1, wherein the condenser (L) comprises a coolant inlet (M), a coolant outlet (N), a liquid condensate from condenser collected in the receiver (T), the magnetic stirrer and a vapor sampling point (S2) through which vapor phase sample is collected.

9. The apparatus as claimed in claim 1, wherein the mixing chamber (K) comprises a cooling jacket (P); a cooling/heating fluid inlet (Q); a cooling/heating fluid outlet (R) and the magnetic stirrer (E).

10. The apparatus as claimed in claim 1 further comprising a sensor for monitoring at least one metric associated with the VLE samples.

* * * * *